United States Patent [19]
Herbst

[11] Patent Number: 6,063,272
[45] Date of Patent: May 16, 2000

[54] APPARATUS AND METHOD OF REGENERATING AN ACTIVATED CARBON FILTER

[75] Inventor: Robert Herbst, Denver, Colo.

[73] Assignee: Screen Lore Corporation, Colo.

[21] Appl. No.: 09/185,047

[22] Filed: Nov. 3, 1998

[51] Int. Cl.$^7$ .................................................. B01D 29/62
[52] U.S. Cl. ........................ 210/177; 210/185; 210/243; 210/323.2; 210/333.01; 210/408; 210/411; 210/502.1; 210/248; 422/168; 422/177; 55/DIG. 30
[58] Field of Search .................................... 210/175, 177, 210/185, 243, 248, 323.2, 332, 333.01, 407, 408, 409, 411, 502.1; 422/168, 177; 55/DIG. 30

[56] References Cited

U.S. PATENT DOCUMENTS

| | | |
|---|---|---|
| 2,530,524 | 11/1950 | Hlavin . |
| 4,261,805 | 4/1981 | Galliker et al. . |
| 4,518,562 | 5/1985 | Deitz .................................... 376/313 |
| 4,551,217 | 11/1985 | King . |
| 4,619,745 | 10/1986 | Porta . |
| 4,652,727 | 3/1987 | Hoshizaki et al. . |
| 4,872,959 | 10/1989 | Herbst . |
| 4,986,836 | 1/1991 | Tandon ...................................... 55/161 |
| 5,043,050 | 8/1991 | Herbst . |
| 5,207,877 | 5/1993 | Weinberg et al. ....................... 204/130 |
| 5,423,904 | 6/1995 | Dasgupta .................................. 96/146 |
| 5,423,962 | 6/1995 | Herbst . |
| 5,569,455 | 10/1996 | Fukui et al. ............................ 422/174 |
| 5,611,907 | 3/1997 | Herbst . |
| 5,658,372 | 8/1997 | Gadkaree .................................. 95/116 |
| 5,766,458 | 6/1998 | Sekhar et al. ........................... 210/184 |
| 5,980,612 | 11/1999 | Kelly ........................................ 95/106 |

*Primary Examiner*—Robert J. Popovics
*Attorney, Agent, or Firm*—Patnaude & Videbeck

[57] ABSTRACT

An activated carbon filter is regenerated while it remains positioned in a filter vessel by first draining both unfiltered and filtered water out of the vessel and then applying an electric current through the activated carbon body of the filter to drive off contaminants. An inert gas is directed through the filter in a direction opposite to that of the liquid flow and then contaminants are moved from the filter vessel to a multi-stage catalytic converter where they are completely oxidized.

6 Claims, 3 Drawing Sheets

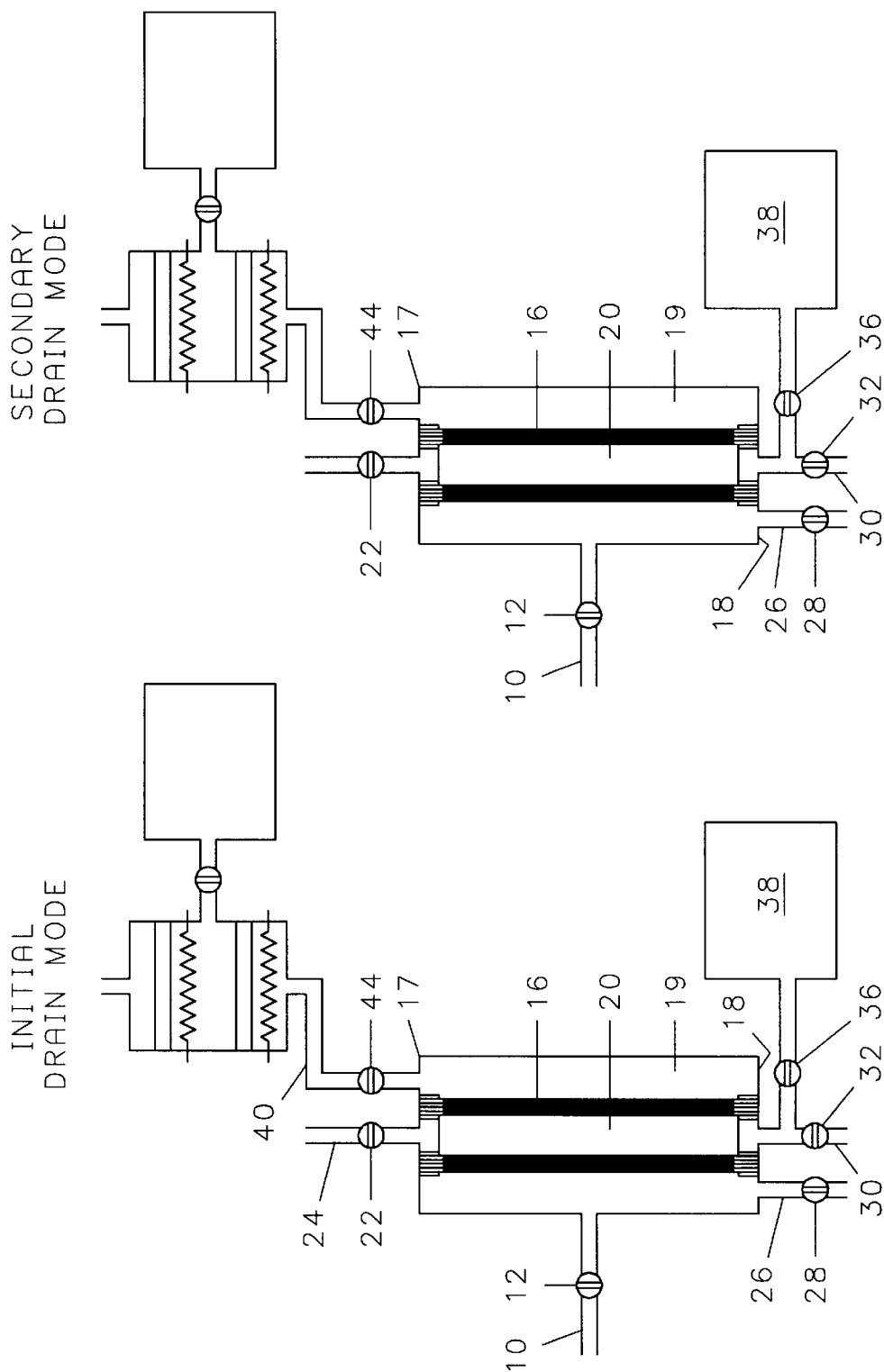

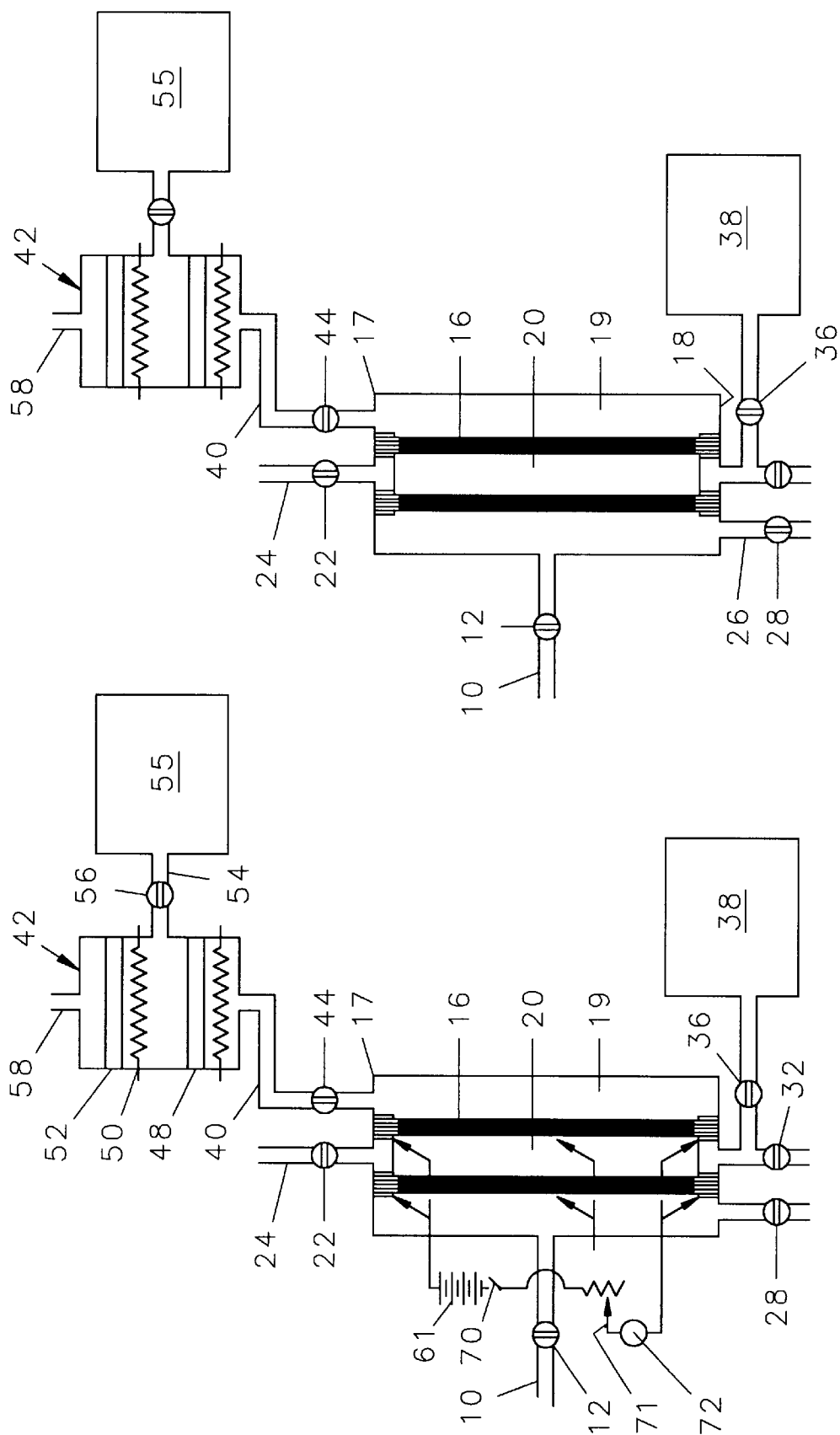

APPARATUS AND METHOD OF REGENERATING AN ACTIVATED CARBON FILTER

The present invention relates to an apparatus and method for regenerating the activated carbon in a carbon filter of a water filter system without requiring that the filter be removed from the filter vessel.

BACKGROUND OF THE INVENTION

A number of filters are available for filtering water, but a commonly used filter employs particles of activated carbon which capture contaminants on the surface of the carbon. Over a period of time, some of the contaminants on the surface are absorbed into the center of the particles, but eventually the activated carbon becomes saturated and must be either discarded or regenerated.

To a minor extent, the useful life of an activated carbon filter can be extended by backwashing to physically remove contaminants that have accumulated on top of the outer surface of the carbon. Backwashing, however, will not remove contaminants absorbed within the particles of activated carbon, nor will it remove contaminants which have been adsorbed on the surface of the particles. Traditionally, the regeneration of activated carbon requires the removal of the filter from the filter vessel and transporting it to a controlled furnace where the contaminants are oxidized while the carbon is left intact. Steam or super heated steam may also be used in conjunction with heat to strip away contaminants. Unfortunately, such processes also result in the loss of some portion (typically 5 to 15 percent) of the activated carbon such that after a number of uses, the filter must be discarded or reconstructed. Furthermore, such existing regeneration processes are labor intensive and require the existence of an off-site scrubbing facility.

It would be desirable to provide an apparatus and method for regenerating activated carbon without requiring the removal of the filter from the filter vessel.

SUMMARY OF THE INVENTION

The present invention is a method of regenerating an activated carbon filter retained within a filter vessel. The vessel has a valve regulated input and a valve regulated output with that liquid admitted into the vessel through the input passing through the filter and be discharged through the output. In accordance with the method, the flow of liquid through the vessel is first terminated by closing the input valve and output valve, and draining the liquid within the filter. A flow of air or an inert gas is then directed through the filter in a direction opposite the direction of the liquid flow to assist in the removal of contaminant particles.

A source of direct current low voltage electric current is connected to the opposite ends of the activated carbon filter for a current to pass through the filter and provide both heat and electrostatic stimulus which drives contaminants out of the activated carbon particles. An inert gas such as nitrogen, carbon dioxide or argon may be used to ensure the carbon is not oxidized during the regeneration process. If air is employed, the quantity of air must be severally limited to prevent the oxidation or the burning of the carbon.

The heated contaminants and particles of mineral scales and other foreign matter are carried by the gasses through one or more heating elements and catalytic converters to complete the oxidation of contaminants into carbon dioxide and water. After the filter has been adequately regenerated, the valves permitting the gas to flow through the filter vessel are closed and the valves permitting the fluid to flow are reopened so that the fluid will again pass through the filter vessel and the activated carbon filter element therein.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawings, wherein like reference numerals identify like elements throughout and in which:

FIG. 2 is a diagrammatic view of the filtering apparatus shown in FIG. 1 with the apparatus shown in its initial drain mode.

FIG. 3 is a diagrammatic view of the filtering apparatus shown in FIG. 1 as it appears in the secondary drain mode.

FIG. 4 is a diagrammatic view of the filtering apparatus as shown in the regenerate mode, and FIG. 5 is a diagrammatic view of the filtering apparatus as shown in the final drain mode.

DETAILED DESCRIPTION OF THE PREFERRED EMBODIMENT

Figure 1:
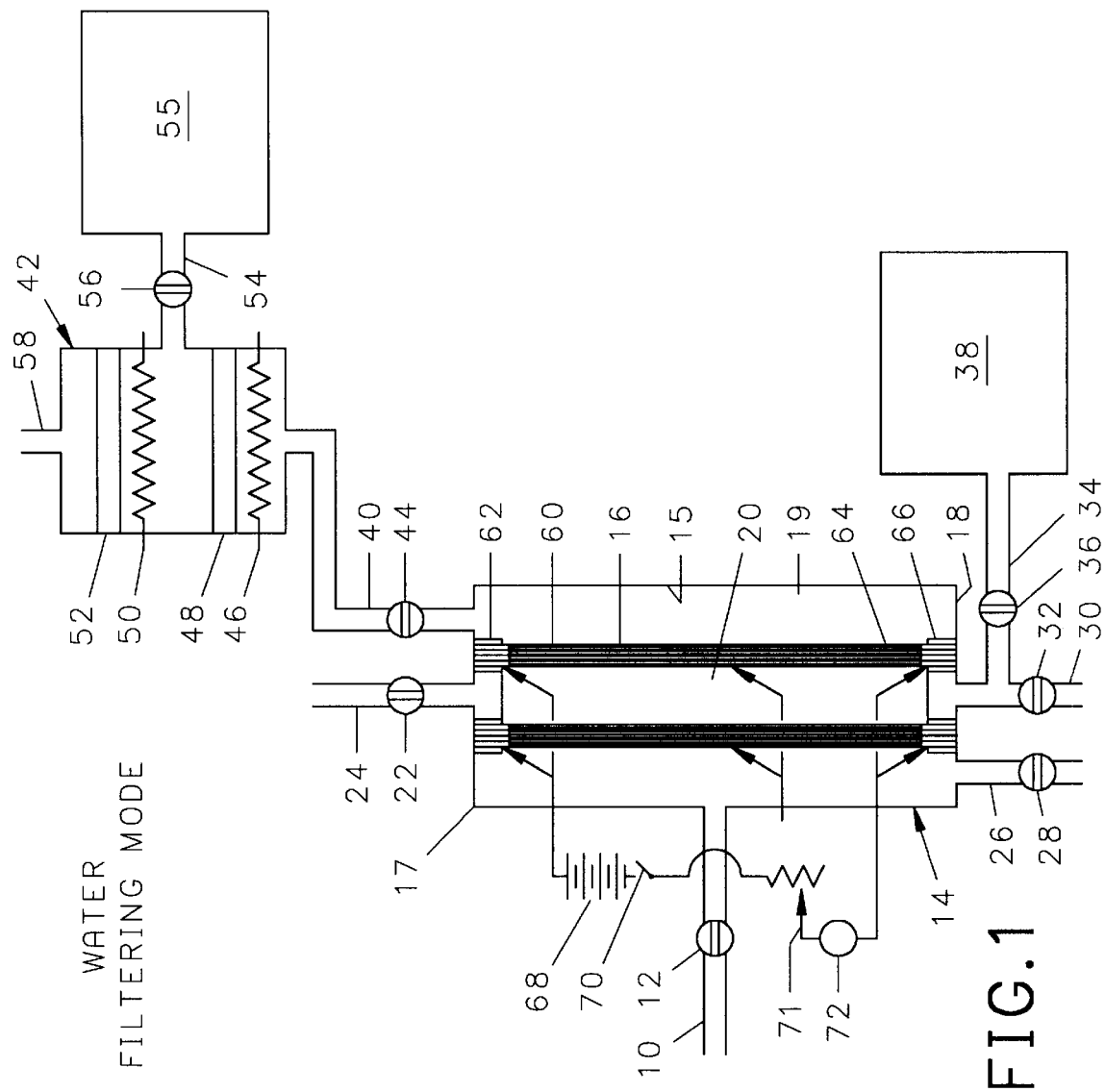
FIG. 1 is a diagrammatic view of a water filtering apparatus including an activated carbon filter constructed in accordance with the present invention shown in its normal watering filter mode.

Referring to FIG. 1, a filtering apparatus constructed in accordance with the present invention for filtering a flow of water is shown in vertical cross-section and includes an input line 10 from a water source, which may be a municipal water system, a storage tank, a lake, or the like where the filter is employed for residential, commercial or municipal use. Water from the input 10 is directed through an input valve 12 into the outer portion of a generally cylindrical filter vessel 14 having an electrically insulated outer wall 15. Fitted within the filter vessel 14 is a tubular activated carbon filter 16 which is sealed to the outer ends 17, 18 of the filter vessel 14 such that input water cannot reach the hollow center of the filter 16 without passing through the tubular side wall of the filter 16. Top wall 17 and bottom wall 18 are also electrically insulated from the activated carbon filter 16, similarly to the vessel outer wall 15. The portion of the vessel which contains the unfiltered water is the tubular surge chamber 19 surrounding the outside of the filter 16 and the cylinder cavity within the tubular filter 16 that includes filtered water is identified as the contact chamber 20. The vessel 14 further includes an output valve 22 and an output line 24 through which filtered water is discharged for usage.

Most filter vessels are oriented to retain the tubular filter 16 with the axis being vertical as shown in FIG. 1 to facilitate removal of the filter. For simplicity, the filter vessel 14 and filter 16 are described herein as being oriented vertically as shown in FIG. 1, with end 17 being the upper end of vessel 14 and end 18 being the lower end of vessel 14.

To facilitate the draining of liquid from within the filter vessel 14, a first outer drain line 26 with a first control valve 28 extends downwardly from the surge chamber 19 through lower end 18 of the vessel to drain liquid out of the input side of the filter 16. Similarly, a second drain line 30 with a second control valve 32 extends downward from the central portion of the lower end 18 of the cylindrical contact chamber 20 to drain filtered liquid from the inside of the filter 16. Connected to the second drain line 30 above the drain valve 32 is a gas input line 34 having a gas input valve 36 for regulating the amount of gas emitted within the center of the filter 32 from a gas source 38.

The filter vessel 14 further includes a gas output line 40, with one end connected to a scrubber 42 and the other end connected to the surge chamber 19 through the upper end 17 of outer wall 15. The movement of gas through the output line 40 is controlled by an output valve 44.

The scrubber 42 includes a first heating element 46, a first catalytic converter 48, a second heating element 50 and a second catalytic converter 52. Positioned between the first catalytic converter 48 and the second heating element 50 is a second gas input line 54 connected to a second gas source 55 which is controlled by a second gas control valve 56. At the far end of scrubber 42 is a gas discharge line 58 through which scrubbed gasses are emitted.

The upper end of the tubular filter 16 is retained within concentric inner and outer tubular electrical contact rings 60, 62 and the lower end of the filter 16 is retained within concentric inner and outer tubular electrically conductive contact rings 64, 66. A source of electrical power, preferably a source of low voltage DC power 68, is connected in series with a switch 70. Potentiometer 71 is positioned between the upper contacts 60, 62 and the lower contacts 64, 66 such that when the switch 70 is closed the filter 16 is in the circuit and a low voltage current will pass therethrough. The setting of the potentiometer is controlled by a timer 72 which may include a computer, not shown.

OPERATION OF THE INVENTION

During normal filter usage, water from the input line 10 passes through the input valve 12 into the tubular surge chamber 19 portion of the vessel 14 surrounding the outside of the filter 16. As the water passes through the tubular wall of the filter 16, impurities in the water are first adsorbed on the outer surface of the filter 16 and may later be absorbed by the activated carbon particles making up filter 16 until the filter is spent or saturated. At that time, the valves 12 and 44 are closed to prevent inlet water from flowing into the surge chamber 19 and treated water from being drained back from the scrubber 42 to the surge chamber 19.

Referring to FIG. 2, as a second step in the filtering process described herein, which is known as the initial drain mode, first control valve 28, which may also be described as a solids blow down valve, is opened adjacent the bottom of the surge chamber 19. The gas input valve 36 is opened to provide either a pulse or constant back pressure to the contact chamber 20 which acts through the side wall of the activated carbon filter 16 to dislodge solid cake or scale from the outside of the filter 16 and push such solids through the first control valve 28 and the drain line 26.

Referring to FIG. 3, during the step of the filter regeneration method known as the secondary drain mode, second control valve 32 is opened to allow any residual filter water to drain from the contact chamber 20 through discharge line 30. With the steps shown in FIG. 2 and FIG. 3 completed, most of the untreated water in the filter will have been drained through drain line 26 and along with any solid matter on the outside surface of the tubular filter 16. Also, most of the treated or filtered water will be drained through the drain line 30 and the second control valve 32.

Referring to FIG. 4, the filter is shown in the step known as the regeneration mode wherein both the first control or drain valve 28 and the second control or drain valve 32 are closed. Next, the discharge valve 44 adjacent the top 17 of the vessel 16 is opened. The switch 70 is then closed to start direct electric current through the activated charcoal filter 16, turning it into a resistor which creates heat throughout the filter 16. The gas input valve 36 may be temporarily closed between the process as shown in FIG. 3 and the step shown in FIG. 4, however, at some time during the activated carbon heating process, the gas input valve will be reopened to allow a controlled volume of inert gas from the first gas source 38 to pass into the contact chamber 20. Gas from the gas source 38 will pass through the filter 16 from the interior control chamber to the surge chamber exteriorly of the filter 16 which is a direction reversed to that of the water flow through the filter as shown in FIG. 1. The reversed gas flow will collect impurities in the form of solids loosened from the outer wall of the filter 16 and gasses released from the activated carbon as a result of the application of heat, and the contaminant laden gas is discharged through the discharge line 40 to the scrubber 42.

Within the scrubber 42, the contaminant laden gas is further heated by the first or primary heating element 46 and particulate matter is broken down into simple carbon compounds by the first catalytic converter 48. To ensure that all the organic compounds in the gas are oxidized, additional air from the second gas source 55 is admitted through the second gas line 54 by opening the second gas control valve 56. The gas from the second gas source 55 is then combined with the contaminant laden gasses flowing through first catalytic converter 46 and these gasses are then heated by the second heating element 50 and are further and more completely oxidized by being passed through the second catalytic converter 52. Additional heating elements and catalytic converters (not shown) may be employed if required, in order to insure that the discharged gasses emitted through the exhaust tube of output line 58 are fully oxidized into carbon dioxide and water.

During the regeneration of the filter 16, all the contaminants embedded in the particles of activated carbon are boiled off one after another as the voltages across the filter 16 is increased by regulating the potentiometer 71 and the critical vapor temperatures thereof are reached until only the activated carbon remains. This process should continue until all the contaminants are purged out of the activated carbon filter. At this time, the low voltage electric current is shut off and the controlled air is allowed to keep flowing to cool the regenerated carbon filter. After the carbon filter is cooled, the air is also turned off along with the heating elements from the catalytic converter and the excess secondary gas or air.

Referring to FIG. 5, in the final drain mode, once the filter has been regenerated, the air flow from the air sources 38, 54 are shut down by closing valves 36, 44 and 56. Thereafter, valves 22 and 28 are reopened to allow treated water to flow back through the filter to carry away any dried scale and solids that may have collected on the outside of the carbon filter tube 16 and drain these contaminants down to the discharge line 26 to solids collection tank (not shown). After a short back cycle, drain line 28 is closed and valve 12 is opened to restart the filtering cycles, shown most clearly in FIG. 1.

There has, therefore, been disclosed a method for regenerating activated carbon filters whereby the filter 16 is regenerated without removing it from the vessel 14 in which it is enclosed. In the preferred embodiment, the electric power applied across the filter 16 is progressively increased to increase the amount of heat created within the filter 16 in steps with each step corresponding to the heat required to expel a different impurity from the activated carbon. The control timer 72 regulates the period of time that a current is applied across the filter 16 for each of the steps to thereby control the progress of the regeneration.

While the present invention has been described in connection with a single embodiment, it will be understood that changes and modifications may be made without departing from the true spirit and scope of the invention, and it is intended by the appended claims to cover all such changes and modifications which come within the true spirit and scope of the invention.

What is claimed:

1. An activated carbon water filter mounted in a filter vessel of a filtration assembly including means for regenerating the activated carbon therein without removing said filter from said filter vessel, said filtration assembly comprising:

hollow filter vessel means for housing a barrier filter therein in electrically insulated relation thereto, an activated carbon barrier filter mounted in said vessel to divide said filter vessel into an upstream pre-filter portion and a downstream post-filter portion, first gas supply means in fluid communication with said downstream post-filter portion of said vessel for exerting a gas back pressure from said downstream post-filter portion of said filter vessel to said upstream pre-filter portion of same, direct current circuit means in which said activated carbon barrier filter is positioned as a resistor in electrically insulated relation to said hollow filter vessel means for heating said activated carbon barrier filter to drive off contaminants adsorbed or absorbed on said carbon therein, and catalytic oxidation means in fluid communication with said upstream pre-filtered portion of said hollow filter vessel means for oxidizing contaminants driven off said activated carbon barrier filter.

2. The filtration assembly as defined in claim 1 further including means for selectively draining solid matter and pre-filtered water from said upstream pre-filter portion of said filter vessel.

3. The filtration assembly as defined in claim 1 wherein said activated carbon barrier filter is tubular in shape having an outer cylindrical porous surface and an inner hollow porous bore, said outer cylindrical porous surface partly defining said upstream pre-filter portion of said filter vessel, and said inner hollow porous bore partly defining said downstream post-filter portion of said filter vessel.

4. The filter assembly as defined in claim 1 wherein said catalytic oxidation means includes a first heating element downstream of said filter vessel for heating gas and contaminants driven off said activated carbon filter, a first catalytic converter downstream of said first heating element for breaking down said contaminant into simple carbon compounds.

5. The filter assembly as defined in claim 4 further including, second gas supply means in fluid communication with said catalytic oxidation means in fluid communication with said catalytic oxidation means for providing air or oxygen thereto aiding in more complete oxidation of said contaminants.

6. The filter assembly as defined in claim 4 further including, a second heating element downstream of said first catalytic converter for heating matter exiting said first catalytic converter, and a second catalytic converter downstream of said second heating element for completely oxidizing said contaminant.

* * * * *